United States Patent [19]
Marjanovich et al.

[11] Patent Number: 5,820,837
[45] Date of Patent: Oct. 13, 1998

[54] PROCESS FOR TREATING A GAS STREAM TO SELECTIVELY SEPARATE ACID GASES THEREFROM

[75] Inventors: Barry S. Marjanovich; Don A. Stang, both of Calary, Canada

[73] Assignee: Mobil Oil Corporation, Fairfax, Va.

[21] Appl. No.: 906,657

[22] Filed: Aug. 7, 1997

Related U.S. Application Data

[63] Continuation of Ser. No. 650,488, May 20, 1996, abandoned.

[51] Int. Cl.$^6$ .......................... B01D 19/00; B01D 53/14; C01B 17/16; C01B 31/20
[52] U.S. Cl. .......................... 423/220; 95/161; 95/173; 95/174; 423/226; 423/228; 423/229
[58] Field of Search ..................... 423/220, 226, 423/227, 228, 229; 95/161, 173, 174

[56] References Cited

U.S. PATENT DOCUMENTS

| | | |
|---|---|---|
| 3,284,162 | 11/1966 | Deal et al. . |
| 3,347,621 | 10/1967 | Papadopoulos et al. . |
| 3,352,631 | 11/1967 | Zarker . |
| 3,376,356 | 4/1968 | Freitas et al. . |
| 3,463,603 | 8/1969 | Freitas et al. . |
| 3,767,766 | 10/1973 | Tjoa et al. . |
| 4,184,855 | 1/1980 | Butwell et al. . |
| 4,289,738 | 9/1981 | Pearce et al. .......................... 423/228 |
| 4,330,305 | 5/1982 | Kuessner et al. ........................ 95/174 |
| 4,412,977 | 11/1983 | Fisch ..................................... 423/226 |
| 4,533,373 | 8/1985 | Butz et al. . |
| 4,537,753 | 8/1985 | Wagner et al. ......................... 423/228 |
| 4,551,158 | 11/1985 | Wagner et al. .............................. 55/46 |
| 4,553,984 | 11/1985 | Volkamer et al. .......................... 55/46 |
| 4,557,911 | 12/1985 | Goddin, Jr. et al. ..................... 423/228 |
| 4,997,630 | 3/1991 | Wagner et al. ......................... 423/228 |
| 4,999,031 | 3/1991 | Gerhardt et al. ............................ 55/43 |
| 5,067,972 | 11/1991 | Hemmings et al. . |
| 5,085,675 | 2/1992 | Kriebel et al. . |
| 5,137,550 | 8/1992 | Hegarty et al. ............................. 55/43 |

FOREIGN PATENT DOCUMENTS

| | | | |
|---|---|---|---|
| 939119 | 1/1974 | Canada | ..................................... 95/174 |
| 3236600 | 4/1984 | Germany | ................................. 95/174 |
| 3427134 | 2/1986 | Germany | ................................. 95/174 |
| 1611411 | 12/1990 | Russian Federation | ................. 95/173 |

OTHER PUBLICATIONS

"Gas Reception Uses Modern Solvents to Reduce Emissions"; A. Pelekanou et al; 75$^{th}$ Annual GPA Convention; Denver, CO; Mar. 11–13, 1996.

*Primary Examiner*—Wayne Langel
*Attorney, Agent, or Firm*—Malcolm D. Keen

[57] ABSTRACT

A treatment method for removing acid gases by contacting a sour gas stream with a solvent (e.g. an organic amine) which absorbs $H_2S$ in preference to $CO_2$ and hydrocarbons. The rich solvent is then regenerated by selectively separating the absorbed hydrocarbons in a first flash, a large portion of the $CO_2$ in a high-temperature, low-pressure second flash tank, and the substantially all of the remaining acid gases in a high-temperature, low-pressure stripper. The regenerated solvent is recycled and the recovered acid gases are processed to recover sulphur from the $H_2S$. The $CO_2$ recovered from the second tank is contacted with a second solvent to provide high-quality $CO_2$.

7 Claims, 1 Drawing Sheet

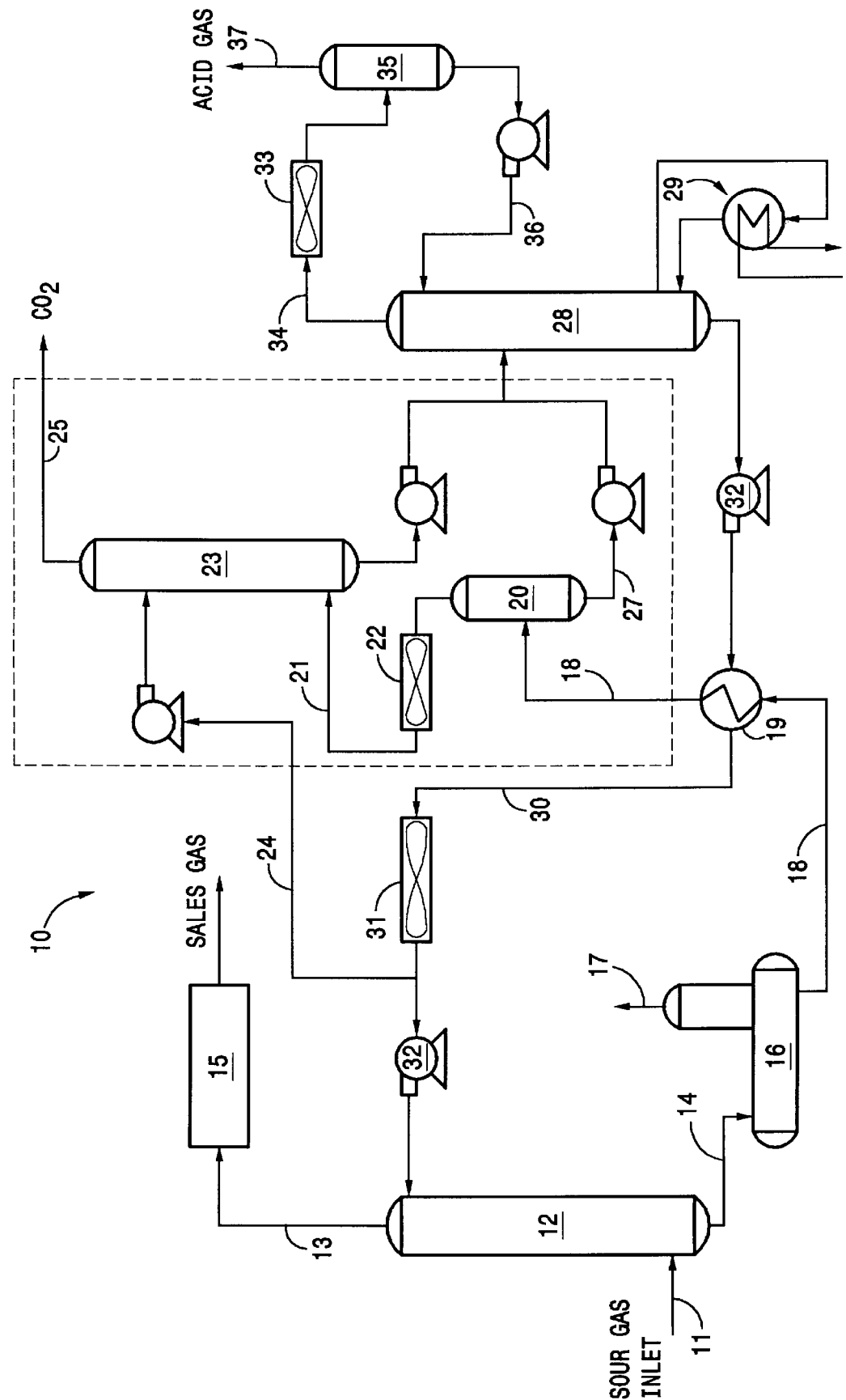

PROCESS FOR TREATING A GAS STREAM TO SELECTIVELY SEPARATE ACID GASES THEREFROM

This is a continuation of application Ser. No. 08/650,488, filed on May 20, 1996, abandoned.

DESCRIPTION

1. Technical Field

The present invention relates to a process for selectively separating acid gases from a sour hydrocarbon gas stream and in one of its aspects relates to a gas treatment process whereby a sour hydrocarbon gas stream is contacted with a selective solvent which is preferential to hydrogen sulfide ($H_2S$) as compared to carbon dioxide ($CO_2$) to remove these acid gases from the gas stream and then treating the rich solvent to individually remove substantially the bulk of any hydrocarbons, $CO_2$, and $H_2S$ from the solvent before it is recycled within the treatment process. In particular, the present invention relates to a sour gas treatment method which includes processing the acid gas removed from the sour gas to recover high-quality $CO_2$, and to improve the quality (i.e. concentration of $H_2S$) in the acid gas stream while reducing the total volume of the acid gas stream which is subsequently processed to recover sulphur.

2. Background

It is well known that many hydrocarbon gas streams (i.e. "sour gas") produced from certain subterranean formations contain substantial volumes of "acid gases" (e.g. hydrogen sulfide ($H_2S$), carbon dioxide ($CO_2$) and the like) which must be substantially reduced or removed before the gas can be passed on to market. One common and well known process for treating a "sour gas" stream involves contacting the gas stream in a contactor vessel with a solvent (e.g. organic amines, such as methyldiethanolamine (MDEA) and other additives) which absorbs the acid gases and carries them out of the gas stream. After the acid gases have been removed or reduced to acceptable levels by the solvent, the treated, hydrocarbon gas stream is passed on to market.

Unfortunately, this type of solvent not only absorbs the acid gases from the gas stream but also solublizes and picks up small amounts of liquid hydrocarbons from the stream. In order for processes of this type to be economical, the "rich" solvent (i.e. the solvent plus the acid gases and the small amounts of hydrocarbons) must be regenerated so that it can be reused in the treatment process. That is, the acid gases (i.e. both $H_2S$ and $CO_2$) and the hydrocarbons must be removed or substantially reduced in the rich solvent before it can be reused in the process.

Typically, the rich solvent is regenerated by passing it into a regenerator vessel where substantially all of the acid gases are removed, after which the regenerated solvent is returned for use in the treatment process. In almost all known commercial processes of this type, sulfur is then recovered from the $H_2S$ by processing the recovered acid gas stream through a Sulfur Recovery Unit (SRU), e.g. a Claus unit. However, Claus units which are well known in the industry operate most efficiently with acid gas stream having high concentrations of $H_2S$ and can become uneconomical if the $H_2S$ concentration drops to low.

In order to maintain a high level of $H_2S$ in the recovered acid gas stream, it is necessary to separate out as much of the other contaminants (i.e. $CO_2$ and hydrocarbons) as possible from the rich solvent before the solvent reaches the regenerator vessel. This is typically done by first passing the rich solvent through one or more flash tanks where a large amount of the $CO_2$ and most of the hydrocarbons are collectively vaporized and removed from the rich solvent.

One such gas treatment processes is disclosed in U.S. Pat. No. 3,767,766 wherein a solvent is used to absorb the acid gases from a sour gas stream. The rich solvent is passed through a first flash drum where a first portion of both the hydrocarbons and the $CO_2$ are collectively flashed off and are disposed of. The solvent is then heated and passed through a second flash drum where additional hydrocarbons and residual $CO_2$ are removed and disposed of before the solvent is passed into a regenerator where the $H_2S$ is recovered from the solvent. In this process, the bulk of the hydrocarbons and the $CO_2$ must be handled and disposed of together and since these are likely to also contain small volumes of $H_2S$, their use and/or disposal may present a problem.

Another such process for treating sour gas is that which is disclosed in the paper "Gas Reception Uses Modern Solvents to Reduce Emissions", A.Pelekanou et al, presented at the 75th Annual GPA Convention, Mar. 11–13, 1996, Denver, Colo. In that process, an amine solvent is used to absorb $H_2S$ and mercaptans in preference to $CO_2$. The solvent also absorbs hydrocarbons from the sour gas stream. To reduce the hydrocarbon content of the recovered acid gas stream to the SRU, two pressure "let-down" flash steps are included in the rich solvent regeneration cycle. The rich solvent is passed through a first flash drum which is operated at a relatively high pressure and low temperature to thereby flash off the hydrocarbons which are then recompressed and returned to the process upstream of the gas sweetening steps. The solvent is then heated and passed on to a lower-pressure flash drum where dissolved/lightly absorbed gases contaminated with $H_2S$ are removed and fed to a reducing gas generator in a tail gas unit which forms part of the SRU.

In these prior art processes, the hydrocarbons and any $CO_2$ are collectively removed from the rich solvent along with small volumes of $H_2S$ and are disposed of together. By recovering and disposing of $CO_2$ along with the recovered hydrocarbons (i.e. compressed and burned as fuel or the like), any value that the $CO_2$ may have is lost. Since $CO_2$ can be a valuable asset when used in certain applications (i.e.a drive fluid in Enhanced Oil Recovery methods), the overall economics of such sour gas treatment processes can be improved where the $CO_2$ can be recovered and handled separately. Also, by selectively removing substantially all of the hydrocarbons and a large portion of the $CO_2$ from the rich solvent before the $H_2S$ is recovered, the volume of the acid gas from the regenerator to the SRU is substantially reduced while the $H_2S$ concentration in the stream is substantially increased. This allows smaller SRU's to be used to process the $H_2S$ stream while at the same time providing a higher sulphur recovery efficiency.

SUMMARY OF THE INVENTION

The present invention provides a method for treating a sour hydrocarbon gas stream to remove acid gases (e.g. $H_2S$ and $CO_2$) from said gas stream by contacting said stream with a solvent (e.g. an organic amine such as at least about 50% methyldiethanolamine). The rich solvent is then regenerated by selectively separating the $CO_2$, $H_2S$, and any absorbed hydrocarbons from the rich solvent before the regenerated solvent is recycled in the process.

The hydrocarbons are first removed by passing the rich solvent through a first flash tank having a reduced operating pressure. The solvent is then heated and passed to a second flash tank having a substantially lower operating pressure and a higher temperature than the first flash tank to thereby flash off a substantial portion of the $CO_2$ from the solvent. The solvent is then passed to a stripper where substantially all of the remaining acid gases (i.e. $H_2S$ and $CO_2$) are removed from the solvent which, in turn, is now regenerated and ready for reuse in the process. The acid gases are then sent on to a Sulphur Recovery Unit (e.g. Claus unit) to recover sulphur from the $H_2S$. By selectively separating the hydrocarbons, $CO_2$, and $H_2S$, the volume of the acid gases to be processed by the SRU are substantially reduced while the concentration of the desirable $H_2S$ in the acid gases is increased thereby allowing smaller SRU's to be used to recover basically the same amount of sulphur from a comparable sour gas treatment process.

Further, the $CO_2$ stream, which is separated in the second flash tank, is further processed by passing it to a $CO_2$ contactor vessel where it is contacted with a solvent (preferably a portion of the regenerated solvent). The solvent absorbs substantially all of any $H_2S$ that may be present in the $CO_2$ stream to thereby produce a substantially $H_2S$-free (less than 100 ppms) $CO_2$ stream which can then be used or disposed of without major problems.

More particularly, the present invention provides a "sour gas" treatment process wherein a stream of sour gas is contacted by an organic amine solvent in a high-pressure contactor vessel (i.e. about 800–1200 psig and 50°–120° F.). The solvent is preferably one which absorbs $H_2S$ in preference to both the $CO_2$ and any hydrocarbons which may be absorbed from the sour gas stream (e.g. preferably an liquid amine mixture such as one comprised of approximately 50% methyldiethanolamine)

The "rich" solvent is regenerated by passing it through a first flash tank where the pressure is substantially reduced (e.g. to less about 100 psig) whereby substantially all of any hydrocarbons are "flashed off". The solvent is then heated to a relatively high temperature (e.g. about 215°–240° F.) before it is flowed into low-pressure, second flash tank having a much lower pressure (e.g. less than about 25 psig) where a substantial amount (e.g. 50% or more) of the $CO_2$ is flashed off.

The $CO_2$ stream from the second flash tank is cooled to a lower temperature (e.g. less than about 110° F.) and is then passed into a low-pressure (e.g. 5–15 psig) $CO_2$ contactor vessel where it is contacted by a second solvent (e.g. preferably regenerated solvent) to absorb substantially all of $H_2S$ which may be present. This produces a substantially $H_2S$-free $CO_2$ stream. The second rich solvent is merged with the rich solvent from second flash tank before the merged solvents are passed through a regenerator stripper where substantially all of the acid gases (i.e. $H_2S$ and the remaining $CO_2$) are stripped out of the rich solvent. The now "regenerated solvent" is recycled back to high-pressure contactor vessel while the acid gases are passed to a Sulphur Recovery Unit (SRU) where the sulphur is commercially recovered.

BRIEF DESCRIPTION OF THE DRAWINGS

The actual construction, operation, and apparent advantages of the present invention will be better understood by referring to the drawings which are not necessarily to scale and in which:

The FIGURE a schematical representation of a sour gas treatment process in accordance with the present invention.

BEST KNOWN MODE FOR CARRYING OUT THE INVENTION

Referring now to the drawings, the FIGURE schematically illustrates a "sour gas" solvent treatment process 10 wherein a stream of sour gas is fed through a line 11 into a high-pressure contactor vessel 12. As will be understood by those skilled in the art, "sour gas" is one which is comprised of a wide range of hydrocarbons (i.e. methane, hexane, dodecane, etc.) which also includes a substantial amount of "acid gases" (i.e. hydrogen sulfide ($H_2S$), carbon dioxide ($CO_2$), etc.). The sour gas stream must be treated to remove or reduce the acid gases to acceptable levels (e.g. from 1–30% $H_2S$ to less than 4 parts per million (ppm) and from 2–30% $CO_2$ to less than 2%) before the gas can be sent to market. Also, as will be understood, the sour gas stream can be pre-treated, e.g. passing it through silica gel absorbers or the like (not shown), before it is fed into contractor vessel 12.

Contactor vessel 12 is typically a bubble-tray tower which has a plurality of horizontal trays (not shown) spaced therein wherein the incoming stream 11 of sour gas flows upward while a solvent flows into and downward through vessel 12. Vessel 12 is normally operated at about 800–1200 psig and 50°–120° F. The solvent is one which will absorb the acid gases from the hydrocarbon gas stream upon contact and will carry the acid gases out the bottom of vessel 12 through outlet line 14. Further, in the present invention, the solvent is preferably one which absorbs $H_2S$ in preference to both the $CO_2$ and any hydrocarbons which may be absorbed from the sour gas stream.

More specifically, the solvent is preferably an liquid amine mixture which is basically comprised of approximately 50% methyldiethanolamine (MDEA) and 50% water. Other known commercially-available "MDEA" solvents of this type which can be used are "UCARSOL" (Union Carbide) and "GAS/SPEC*SS" (Dow Chemical). The MDEA solvent absorbs both $H_2S$ and $CO_2$ but will preferably absorb the $H_2S$, meaning basically that the $CO_2$ and any absorbed hydrocarbons can be more easily removed (i.e. flashed) from the solvent than can be the $H_2S$.

The treated gas flows out of the top of contactor vessel 12 through line 13 and may be further processed (e.g. passed through dew point control unit 15 or the like) before it is passed on to a sales pipeline or the like. The "rich" solvent (i.e. solvent plus absorbed acid gases and any hydrocarbons) is passed through outlet line 14 to be regenerated before it is recycled to contactor vessel 12. As will be recognized by those skilled in this art, the basic gas treatment process described to this point is generally well known in the art.

In accordance with the present invention, the rich solvent from the contactor vessel 12 is regenerated by passing it through line 14 to a first flash tank 16 where the pressure is substantially reduced (e.g. pressure of rich solvent is reduced from about 1000 psig to less about 100 psig) whereby substantially all of any hydrocarbons in the rich solvent will be "flashed off" and recovered through line 17. As will be understood, these hydrocarbons can be compressed and used as fuel or can otherwise be disposed of. The operating temperature in first flash tank 16 will be substantially the same as that of the incoming rich solvent (e.g. 135°–160° F.).

The rich solvent, with substantially all of the hydrocarbons now removed, flows through a heat exchanger 19 in line 18 where it is heated by the regenerated solvent as will be further explained below or it can be heated by other means. The temperature of the rich solvent is raised to a relatively high temperature (e.g. 215°–240° F.) before it is flowed into low-pressure, second flash tank 20 which is designed to operate at very low pressures (e.g. less than about 25 psig). At these temperatures and pressures, substantial amounts (e.g. 50% or more) of the $CO_2$ in the rich solvent may be flashed off and recovered through line 21.

The $CO_2$, which is flashed-off in low-pressure second flash tank 20, is likely to contain substantial amounts of $H_2S$ (e.g. around 20% which flashes off with the $CO_2$) which must be removed or reduced from the $CO_2$ stream before the $CO_2$ can be disposed of. The $CO_2$ and its $H_2S$ contaminant is further processed by passing the stream from second flash tank 20 through a cooler 22 in line 21 to substantially lower its temperature (e.g. less than about 110° F.) before the stream is passed into low-pressure $CO_2$ contactor vessel 23 (e.g. operated at 5–15 psig).

A second lean solvent (e.g. preferably a side stream of regenerated solvent which is being recycled to contactor 12) is flowed through line 24 to $CO_2$ contactor vessel 23 where it contacts the stream of $CO_2$ to absorb substantially all of the $H_2S$ therefrom. The now, substantially $H_2S$-free $CO_2$ can then be disposed of or it can be recovered through line 25 for commercial use (i.e. injected into a subterranean reservoir as a drive fluid in an Enhanced Oil Recovery method).

gas stream (e.g. increased by as much as 55%) allows a much smaller SRU plant to efficiently recover basically the same amount of sulphur from a sour gas treatment operation of comparable size. Further, since both the hydrocarbons and the $CO_2$ recovered from the rich solvent are substantially free of $H_2S$, the problems normally associated with their respective disposal and/or use are also substantially reduced. Still further, the recovered and processed $CO_2$ can be used or sold, thereby increasing the overall economics of the sour gas treatment process.

To further illustrate the present invention, the following Material Balance Table is set forth. The Table is representative of a typical sour gas treatment process in accordance with the present invention. The results in the Table are based on the processing of 185 MM standard cubic feet a day (MMscfd) of a sour gas having a particular composition. The numerals in the headings correspond to the components and conditions in like-numbered elements in the FIGURE.

MATERIAL BALANCE TABLE

| COM-PONENT | SOUR GAS (11) ** | SWEET GAS (13) ** | RICH SOLVENT FROM (12) | OVER-HEAD (17) | BOT-TOMS (18) | OVER-HEAD (20) | BOT-TOMS (20) | OVER-HEAD (23) | BOT-TOMS (23) | COMBINED SOLVENTS TD (28) | OVER-HEAD (28) | BOTTOMS (28) | ACID GASES (37) |
|---|---|---|---|---|---|---|---|---|---|---|---|---|---|
| HC | 18590.90 | 18578.23 | 12.67 | 12.67 | 0.00 | 0.00 | 0.00 | 0.00 | 0.00 | 0.00 | 0.00 | 0.00 | 0.00 |
| $CO_2$ | 1216.98 | 375.38 | 853.81 | 3.30 | 858.51 | 464.81 | 385.70 | 372.08 | 99.17 | 488.51 | 489.52 | 22.20 | 489.52 |
| $H_2S$ | 242.99 | 0.08 | 247.80 | 0.44 | 247.36 | 87.94 | 159.42 | 0.07 | 90.45 | 250.44 | 242.84 | 8.88 | 242.84 |
| Temp. °F. | 110 | 114 | 156 | 156 | 156 | 219 | 219 | 111 | 118 | 226 | 217 | 261 | 120 |
| P(psig) | 935 | 935 | 935 | 90 | 90 | 18 | 18 | 12 | 13 | 14 | 14 | 18 | 14 |

**All units = pound-mole/hour

The second solvent and the absorbed $H_2S$ flows from the $CO_2$ contactor 23 through line 26 and is merged with the rich solvent in line 27 from second flash tank 20 before the merged solvents are passed through regenerator stripper 28. Contactor 28 is equipped with a reboiler 29 for adding additional heat to the solvent and is designed to operate at relatively-high temperatures (e.g. about 250°–270° F.) and relatively-low pressures (e.g. less than about 15 psig) whereby substantially all of the $H_2S$ and most of the remaining $CO_2$ are stripped out of the rich amine solvent. The now "regenerated solvent" flows from the bottom of contactor 28 and is recycled back to high-pressure contactor vessel 12 through line 30. The regenerated solvent is cooled before reentering contactor 12 by passing it through (a) heat exchanger(s) 19 where it gives up heat to the rich solvent and (b) additional cooler(s) (e.g. 31), if needed. The pressure of the recycled solvent is raised by one or more pumps 32 (two shown) as will be understood in the art.

The acid gases (i.e. the $H_2S$ and most of the remaining $CO_2$) pass from the top of stripper 28 through a cooler 33 or the like in line 34 to a reflux separator 35. Any liquids which are condensed in reflux separator are returned through line 36 to stripper 28. The acid gases are recovered through line 37 and are normally passed on to a Sulphur Recovery Unit (SRU), such as a well-known Claus unit (not shown) where the sulphur is recovered for commercial applications.

By substantially reducing the amount of $CO_2$ in the acid gases, the total volume of acid gases that must be processed by a SRU is significantly reduced (e.g. acid gas volume reduced by as much as 35% in one actual application). This, in addition to the increased concentration of $H_2S$ in the acid

What is claimed is:

1. A method for treating a sour hydrocarbon gas stream containing hydrogen sulfide ($H_2S$) and carbon dioxide ($CO_2$), said method comprising:

passing said sour hydrocarbon gas stream into a high-pressure contactor vessel;

contacting said sour hydrocarbon gas stream with a solvent within said contactor vessel to absorb $H_2S$ and $CO_2$ from said sour gas stream to produce a rich solvent;

passing said rich solvent through a regeneration cycle to regenerate said rich solvent by removing substantial amounts of said $H_2S$ and $CO_2$ and any hydrocarbons absorbed by said solvent from said sour gas, said regenerating comprising:

passing said rich solvent through a first flash tank having an operating temperature of from about 135° to about 160° F. wherein the pressure of said rich solvent is reduced to less than about 100 psig to separate only substantially all of the hydrocarbons from said rich solvent;

recovering said separated substantially all of said hydrocarbons from said first flash tank and removing said separated hydrocarbons from said regeneration cycle for individual handling;

heating said rich solvent from said first flash tank to a temperature of from about 215° to about 240° F. before passing it through a second flash tank where the pressure of the solvent is further reduced to less than about 25 psig to thereby selectively separate a substantial portion of said $CO_2$ from said rich solvent;

recovering said separated substantial portion of said $CO_2$ from said second flash tank and removing said separated portion of said $CO_2$ from said regeneration cycle;

passing said separated $CO_2$ from said second flash tank to a $CO_2$ contactor vessel; and contacting said $CO_2$ with a second solvent to absorb substantially all of any $H_2S$ present in said $CO_2$ to produce a second rich solvent;

passing said rich solvent from said second flash tank to a stripper to separate substantially all of said $H_2S$ remaining in said rich solvent to thereby regenerate said solvent;

removing said separated, substantially all of said remaining $H_2S$ from said stripper and removing said separated $H_2S$ from said regeneration cycle for separate handling; and recycling said regenerated solvent to contact said sour gas stream.

2. The method of claim 1 wherein said solvent is comprised of an organic amine which absorbs $H_2S$ in preference to both $CO_2$ and hydrocarbons.

3. The method of claim 2 wherein said organic amine is at least about 50% methyldiethanolamine.

4. The method of claim 2 wherein said second solvent is comprised of said regenerated solvent.

5. The method of claim 2 wherein said second rich solvent is combined with said rich solvent from said second flash tank before said solvents are passed to said stripper.

6. The method of claim 4 wherein said $CO_2$ from said second flash tank is cooled before it is passed through said $CO_2$ contactor vessel.

7. The method of claim 2 wherein:

said $CO_2$ contactor vessel has an operating temperature of less than about 110° F. and an operating pressure of from about 5 to about 15 psig.

* * * * *